E. DAVIS.
Winnower.

Patented Mar. 1, 1870.

Witnesses.
Villette Anderson,
Chas. Kenyon.

Inventor.
Evan Davis
Chipman Hosmer & Co
Attorneys

E. DAVIS.
Winnower.

Patented Mar. 1, 1870.

United States Patent Office.

EVAN DAVIS, OF ALMOND, NEW YORK.

Letters Patent No. 100,379, dated March 1, 1870.

IMPROVEMENT IN GRAIN-SEPARATORS.

The Schedule referred to in these Letters Patent and making part of the same

*To all whom it may concern:*

Be it known that I, EVAN DAVIS, of Almond, in the county of Allegany, and State of New York, have invented a new and valuable Improvement in Grain-Separators; and I do hereby declare that the following is a full, clear, and exact description of the construction and operation of the same, reference being had to the annexed drawings making a part of this specification, and to the letters and figures of reference marked thereon.

Figure 1 of the drawings is a representation of a central vertical section of my invention;

Figure 1:
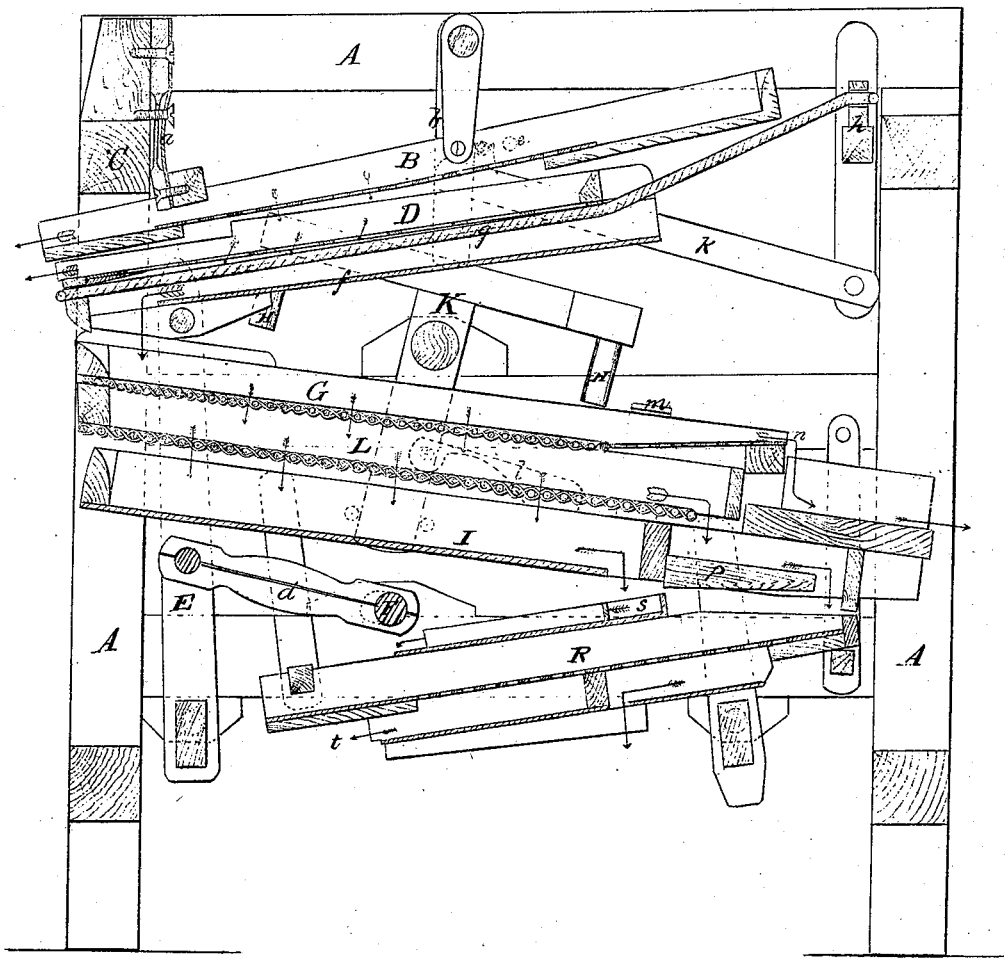
Figure 2:
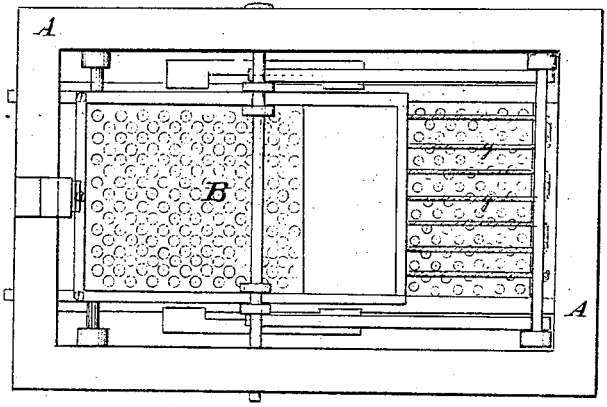
Figure 2 is a top view of the same.
Figure 3:
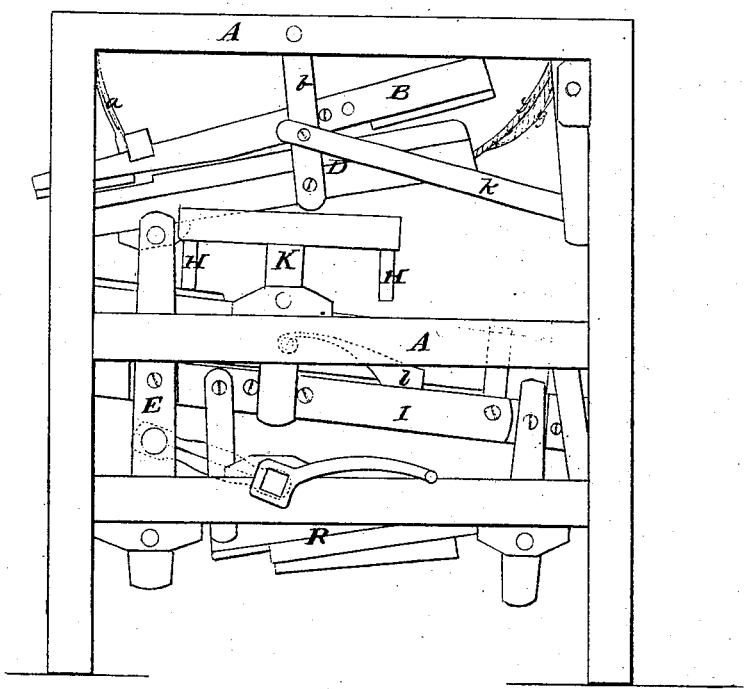
Figure 3 is a side view.

My invention relates to grain-separators, and consists, mainly, in the construction and novel arrangement of the sieves, the devices for shaking them, and the means for keeping the long-mesh sieve clear of lodged grain and other obstructions.

The letter A, of the drawings, designates the frame-work of my separator.

B, the upper sieve, so formed that its upper end has a greater inclination or pitch than the lower or discharging-end, thereby providing for a more rapid movement of the mass of the grain, &c., which is put in at the upper end. As it progresses along the sieve it becomes thinned out by the passage of the grain through the perforations of the sieve, and a slower movement becomes desirable.

This sieve is operated by the spring $a$ and adjustable lever $b$.

The spring $a$ acts in such a manner as to cause the forward part of the sieve to strike against the cross-beam C of the frame-work with a degree of force corresponding to the distance it is drawn backward by the lever $b$, which distance is regulated by the pin $c$, adjustable in the perforations $e\ e$ in the side of the sieve; thus the coarse stuff is readily carried over with but little shaking, while the grain is discharged into the long-mesh sieve below.

D, the long-mesh sieve, operated by the levers E, connected, by the pitman $d$, to the crank-shaft F. This sieve is arranged to have a swinging motion, causing a lengthwise disposition of the grain, &c., therein.

The large wheat is discharged from the lower end of this sieve clean, while the small wheat, chess, oats, cockle, and rye, pass through and fall upon the ledge $f$, which guides them to the upper end of the screen-sieve.

The long-mesh sieve is kept from clogging by means of the cords $g\ g$, arranged longitudinally under the same, and attached to the lower end thereof and to the vibrating bar $h$, operated by the pitman $k$ from the lever $b$. Thus the cords are alternately tightened and slackened, and the rapping thereof against the under side of the sieve dislodges all grain, &c., which may have become wedged in the meshes.

G, the screen-sieve, hung centrally upon the springs $l\ l$ in such a manner as to make it very sensitive to the blows of the reciprocating hammers H H.

The springs $l\ l$ are attached to the vibrating-trough I below the screen-sieve, and operate to communicate a movement backward and forward.

The hammers H H are attached to the ends of cross heads, secured to the levers K, pivoted to the frame-work, and operated by the movement of the trough I.

The vertical vibration caused by the hammers is prevented from being too violent by means of the hooks or stops $m$. The action of the screen-sieve is thus made very effectual, and clogging obviated.

As shown in the drawings, the screen is double, the upper sieve having a finer mesh than the long mesh above it, while the lower screen-sieve is still finer.

The sieve G lets through its meshes oats, chess, and small wheat, and cockle passes through the round holes of the sieve at its lower end.

A portion of the grain passes off clean at $n$.

L, the fine wire screen, which receives the discharge from the sieve G, allows the chess, small cockle, and small oats to pass through its meshes, and carries the remaining small wheat, oats, &c., over the ledge P of the trough I into the lower sieve R.

The chess, small cockle, &c., fall on the trough I, and are discharged on each side by the forked conduit $s$.

R, the lower sieve, arranged to be operated by a spring and adjustable lever, in a similar manner to that above described with reference to the upper sieve B. The lower sieve is perforated with small round holes, adapted to let the small wheat through, while the remainder of the oats are carried over.

The small wheat is discharged at $t$. The very small wheat and large cockle which pass through at the upper end of the sieve are discharged beneath it.

Between the long-mesh sieve and the screen-sieve I usually arrange a round-mesh sieve, the perforations thereof being smaller than those of the upper sieve and larger than those of the next round-mesh sieve below it. This sieve operates to run off a part of the oats.

What I claim as my invention, and desire to secure by Letters Patent, is—

1. The grain-sieve B, having greater inclination at its upper than at its lower end, and arranged to receive a succession of shocks at its forward end by means of the spring *a* and adjustable levers *b b*, when constructed substantially as and for the purposes set forth.

2. The screen-sieve G, made single or double, and pivoted centrally upon the spring bearings *l l*, having a horizontal movement, in combination with the reciprocating hammers H H and stops *m m*, producing double vertical vibration, when constructed and arranged to operate as and for the purposes herein substantially set forth.

3. The long-mesh sieve D, provided with the rapping cords *g g*, when constructed and arranged to operate in the manner substantially as and for the purposes herein described and shown.

4. The arrangement, herein described, of alternate round and long-mesh sieves in a grain-separator, the meshes gradually decreasing in size from the top downward, in the manner and for the purposes substantially set forth.

In testimony that I claim the above I have hereunto subscribed my name in the presence of two witnesses.

EVAN DAVIS.

Witnesses:
  E. W. ANDERSON,
  VILLETTE ANDERSON.